Sept. 4, 1928.

A. O. JAEGER 1,682,787

CATALYTIC APPARATUS

Filed Nov. 5, 1926     2 Sheets-Sheet 1

INVENTOR
ALPHONS O. JAEGER
BY
Newell & Spencer
ATTORNEYS

Sept. 4, 1928.  
A. O. JAEGER  
1,682,787  
CATALYTIC APPARATUS  
Filed Nov. 5, 1926 2 Sheets-Sheet 2

INVENTOR  
ALPHONS O. JAEGER  
BY Newell & Spencer  
ATTORNEYS

Patented Sept. 4, 1928.

1,682,787

UNITED STATES PATENT OFFICE.

ALPHONS O. JAEGER, OF PITTSBURGH, PENNSYLVANIA, ASSIGNOR TO THE SELDEN COMPANY, OF PITTSBURGH, PENNSYLVANIA, A CORPORATION OF DELAWARE.

CATALYTIC APPARATUS.

Application filed November 5, 1926. Serial No. 146,525.

This invention relates to catalytic apparatus and particularly to apparatus for catalytic reactions which are strongly exothermic.

Many catalytic reactions generate a considerable amount of heat and the problem of keeping the temperature within suitable limits is frequently a difficult one, particularly as in many reactions the range of permissible temperature variation is not great. Most vapor phase catalytic reactions also require that the reacting gases be heated up to a fairly high temperature in order to bring about the reaction at all.

In the past there have been used two general types of converters, the tubular converter and the so-called layer or tray type converter, of which the Grillo sulfuric acid converter is an example. The tubular type of converter presents an enormous surface for radiation and is used to a large extent in reactions in which high temperatures are generated. The tray type converter in which the catalyst is usually present in horizontal layers presents a much more serious cooling problem owing to the fact that the central portions of the catalyst layers are not able to radiate their heat satisfactorily and various complicated cooling means have been required.

It is an object of the present invention to combine the structural advantages of the tray type converter with the cooling efficiency of the tubular converters.

It is another object of the present invention to utilize the heat evolved by the exothermic catalytic reaction to heat up the reacting gases to a suitable temperature.

It is a further object of the invention to obviate differences in temperature in various portions of the catalytic layer and to produce a reaction under even and regulated conditions. Other and further objects will appear from a more detailed description of the invention.

I have found that if a cylindrical or other shaped converter shell is provided with catalyst layers which, instead of being arranged horizontally are arranged in the form of an annulus, it is possible to control the temperature of the catalyst and of the gases after passing through the catalyst layer with ease, especially where the annulus is relatively thin and is placed quite close to the periphery of the converter shell. In such a position the radiant heat of the catalyst and the radiant and sensible heats of the gases which have been passed therethrough from the center of the apparatus are easily and quickly absorbed and re-radiated by the external shell of the converter. At the same time the heat on the inner surface of the catalyst ring which, of course, is usually less than on the outer surface owing to a smaller surface area and particularly due to the fact that a large proportion of the heat is carried outwardly by the flow of gas, serves to heat up the incoming gases, particularly when the latter are caused to assume an elongated path and where they pass over suitable surfaces which absorb the radiant heat from the catalyst ring. In this manner the greatest heat is dissipated by the converter shell and the smaller amount of heat from the inside of the catalyst annulus is utilized in heating up the reaction gases.

While the invention is broadly directed to converters in which the catalyst is arranged in the form of an annulus, it should be understood that other arrangements may be associated therewith. For example, the gases may first pass through a well cooled annulus and may then pass through horizontal catalyst layers since the heat which is evolved in these latter layers is relatively small, as it is a well known fact that the greatest heat is generated in the first catalyst layer where the concentration of reaction gases is the highest and correspondingly the reaction is most intense. The combination of a catalyst annulus with subsequent horizontal catalyst layers therefore can be used and serves to conserve the space in a converter in a very economical and satisfactory fashion. Other catalyst arrangements can also be used in conjunction with the annulus and are included in the invention.

Instead of permitting the converter shell to radiate heat to the atmosphere it is also possible to utilize this heat, or at least a portion of it, to heat up part or all of the reaction gases, particularly where these latter are required to be heated to a relatively high temperature. This arrangement can be effected by a double wall converter in which the inner chamber contains a catalyst annulus and reaction gases are passed in the space between the outer and the inner wall and serves to remove the heat from the inner shell. Obviously, of course, combinations of these two arrangements may be utilized, that is to say, part of the converter shell containing the catalyst annulus may be directly exposed to the atmosphere or to any other cooling medium and part of the shell may be in contact with incoming gases.

Since by means of the present invention practically all parts of the catalyst annulus are near a cooling surface it is readily possible to maintain a uniform catalyst temperature throughout the annulus, that is to say, throughout concentric portions of the annulus as, of course, the temperature on a line drawn through the annulus at right angles to its axis will naturally show a gradient or several gradients. As, however, the catalyst annulus can be relatively thin, the temperatures even in the center do not rise to dangerous figures.

While it is an advantage of the present invention that many catalytic reactions can be carried out in converters which are provided only with air or gas cooling it should be understood that the present invention does not exclude other cooling means such as, for example, cooling pipes passing through the catalyst annulus but even where such additional cooling is utilized, the advantages of the present invention are obtained in that the temperature is easily maintained substantially uniform and a much smaller amount of cooling medium need be circulated owing to the greater efficiency of the air cooling of the converter shell.

In the drawings, two types of converters are illustrated in a somewhat diagrammatic form and are intended only as typical illustrations of the invention which is in no sense limited thereto and, on the contrary, any suitable structures may be used in carrying out the principles of the present invention and the proportioning of surfaces, material used, converter sizes and the like, will in every case be chosen by the skilled chemical engineer with due regard to the conditions of the particular reaction in which the apparatus is to be used. Thus, for example, where a more intense cooling of the converter shell is desired it may be sprayed with liquids or be swept by an air blast or any other suitable cooling means may be adopted.

The invention will be described in greater detail in connection with the drawings, in which—

Figure 1:
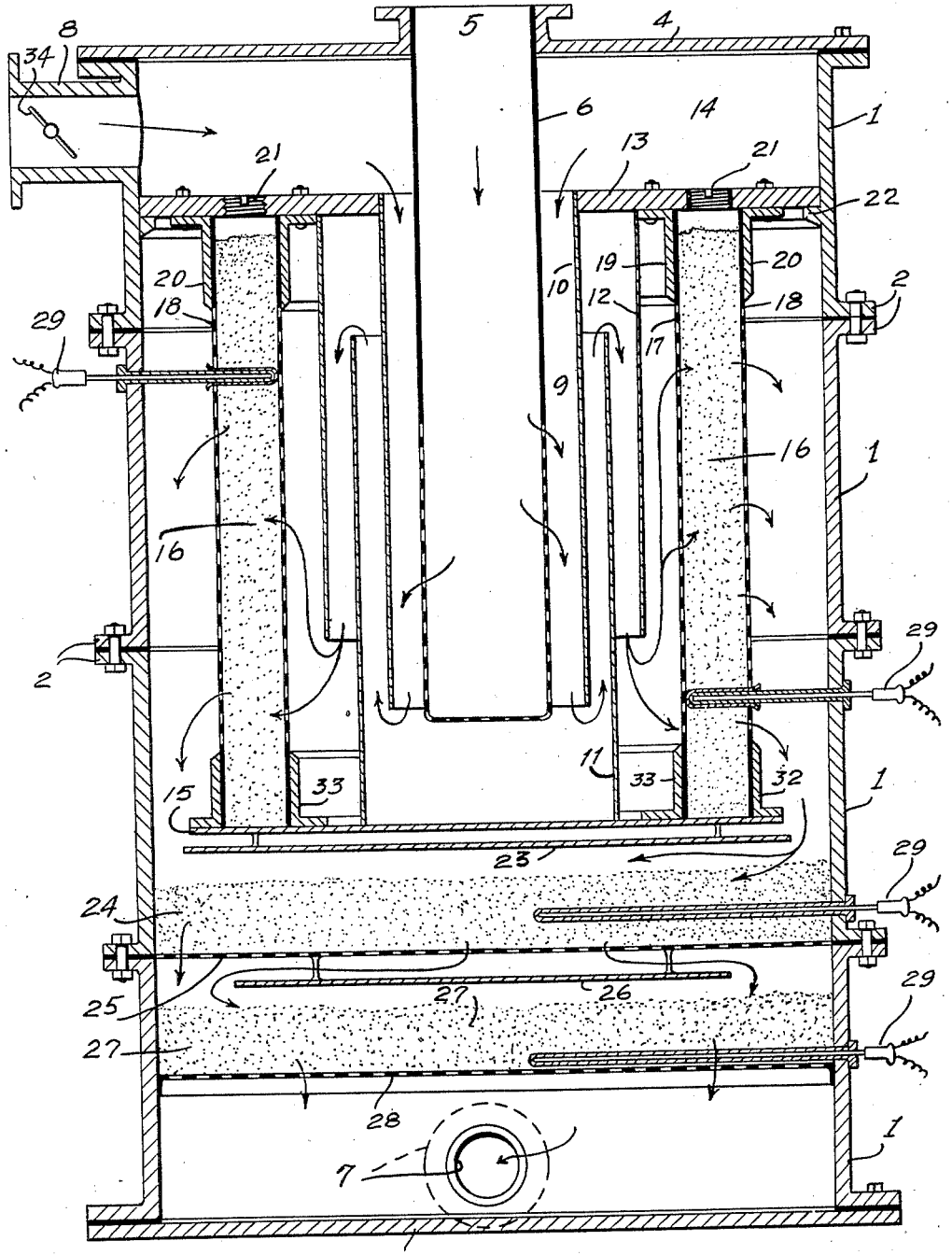
Figure 1 is a converter having an air cooled shell.

In the construction shown in Figure 1, the converter consists in rings 1 provided with flanges 2 which are fastened together with suitable bolts. A bottom piece 3 and a top piece 4 complete the gas-tight shell structure. A horizontal partition 13 having suitable openings is mounted on shoulders 22 of the upper ring 1 and carries two perforated cylinders 17 and 18 which are fastened to suitable brackets 19 and 20 respectively. The lower ends of these perforated cylinders are connected to a lower partition 15 by the brackets 32 and 33. The partition 15 does not extend over the full area of the converter but leaves an annular space between it and the converter shell. Cylindrical baffle plates 10 and 12 are also carried by the partition 13 and extend downwardly for a portion of the distance between the partitions 13 and 15, a cylindrical baffle 11 rises from the partition 15 between the baffles 10 and 12.

The upper ring 1 is provided with a flanged pipe inlet 8 controlled by a damper 34 and the top piece 4 is also provided with a flanged opening 5 in which a pipe 6 is mounted and extends downwardly and concentrically with the inner cylindrical baffle 10. The pipe 6 is closed at its lower end and provided with perforations in the bottom and sides for a considerable distance.

The upper ring 1, top 4, partition 13 and pipe 6 define an annular chamber 14, whereas the baffle 10, pipe 6 and partition 15 define a chamber 9 which is open at the top and is annular in shape for most of its extent.

The annular space between the perforated cylinders 17 and 18 is filled with catalyst 16 through suitable holes in the partition 13 which may advantageously be closed by plugs 21. Additional catalyst layers 24 and 27 are arranged on perforated partitions 25 and 28 below the partition 15 and extend all the way across the converter. The latter perforated partitions with the lower ring 1 and the bottom piece 3 define an exit compartment which is provided with a flanged pipe outlet 7. A radiating surface 23 is fastened to the partition 15 and a similar surface 26 is fastened to the perforated partition 25, this latter surface also performing the function of a baffle as will be apparent from a consideration of the gas flow, as indicated by arrows in the drawing. The temperature of the catalysts at various zones is measured by suitable thermo-couples 29 arranged in wells.

In operation reaction gases enter through the opening 5 passing downwardly through the pipe 6 and diffuse into the chamber 9 through the perforations. From the chamber 9 they are forced to follow a tortuous course over the baffles 11 and 12 and finally pass through the perforated cylinder 17, the catalyst layer 16, and the perforated cylinder 18 into the annular space adjacent to the outer shell of the converter. The gases in passing through the catalyst are highly heated by reason of the exothermic reaction taking place therein, for example, when a converter is used for the oxidation of sulfur dioxide to sulfur trioxide and the radiant heat from the inner surface of the catalyst serves to heat up the incoming gases partly by direct absorption in the gases and partly by the heating of the baffles through radiant heat or from heat conducted from the hot catalyst layer through the metallic partition 15. The radiant heat of the outer surface of the annular catalyst chamber, together with the sensible heat of the gases emerging therefrom is absorbed by the rings 1 of the converter shell and is radiated to the atmosphere or otherwise removed.

The gases partly cooled by the converter shell pass downwardly and then through the catalyst layer 24 and perforated plate 25. The heated gases are prevented from heating partition 15 by the baffle plate 23. In passing through the catalyst layer 24 the gases become heated, as does the catalyst layer itself but not to anywhere near such a degree as in the passage through the annular catalyst layer 16 where the reaction proceeds at maximum velocity. After passing through catalyst layer the gases are deflected outwardly by the baffle plate 26 and are forced to contact with the converter shell where they are subject to further cooling and then pass through the second catalyst layer 27 and perforated plate 28, finally passing out through exit pipe 7. It is usually unnecessary to provide for cooling the catalyst layer as the amount of heat generated is comparatively small. In some cases it may be desirable to provide cooling means and in certain cases even heating means.

Where it is necessary to add further cold gases this can be effected through the opening 8 into the chamber 14 where the gases flow directly down into the chamber 9. The amount of flow can be simply controlled by the damper 34.

It will be seen that the heating and cooling requirements of the progressive stages of the reaction are simply and efficiently regulated by the converter above described and it is possible to maintain the temperatures at a suitable point. Further regulation can be effected by the damper 34 which may, for example control the introduction of a more or less inert gas which serves to control the speed of the reaction as it operates to control the concentration of the reaction components contacting with the catalyst.

It is desirable to produce a very even flow of gas through the catalyst so that no portion receives an undue amount of gas and thereby the evolution of heat is maintained uniformly. The tendency to channeling of the gases in passing through the catalyst is avoided in part by the fact that they strike the catalyst ring broadside and partly by the fact that the baffles prevent any high velocity blasts from striking any particular portion. Any unevenness which may take place, however, can be easily compensated for by a varying perforation size in the cylinder 17 or the cylinder 18 or both, so as to produce a uniform gas flow throughout the whole height of the perforated cylinders. Additional baffles may, of course, also be utilized where their use may be desirable. Of course, the perforation size and baffling will be varied with the different reactions which are to take place so as to effect an optimum gas speed. A thorough mixture of the reaction gases is also effected and this in turn adds to the uniformity of reaction.

In some cases it may not be necessary to provide additional horizontal catalyst layers and in other cases it may be desirable to provide a larger number than are shown. The invention is in no sense limited to the use of two horizontal layers which are merely given as an illustration of one embodiment and on the contrary, the number of layers, thickness and arrangement will be determined in each individual case by the conditions which obtain.

Figure 2:
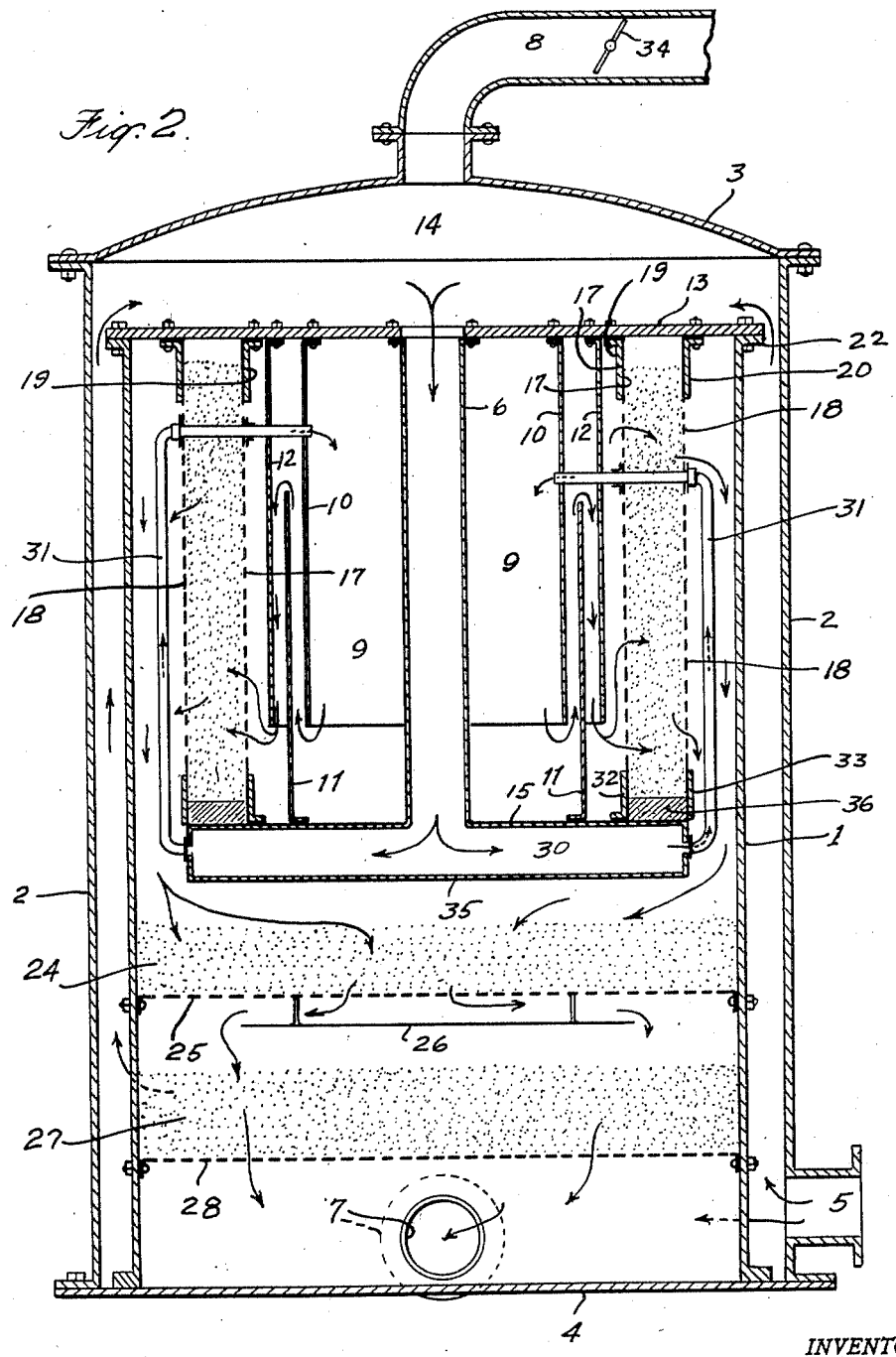
Figure 2 is a vertical section through a modified double-wall converter having a gas cooled inner shell.

A somewhat different arrangement is shown in Figure 2. In this figure the outer converter shell consisting in side walls 2, top piece 3 and bottom piece 4 does not contain the catalyst. On the contrary, a concentric inner converter having a cylindrical side wall 1 and top partition 13 mounted thereon. The partition is provided with a central opening through which a pipe 6 passes downwardly into a chamber 30 formed by a partition 15 and a second partition 35. The partitions are carried as in Figure 1, by brackets 32 and 33 which are attached to the perforated catalyst cylinders 17 and 18, these being in turn hung from the upper partition 13 by the brackets 19 and 20. Cylindrical baffles 10, 11 and 12 are hung or mounted on the partitions 13 and 15 as in the case of Figure 1, and define an annular chamber 9. This chamber, however, is not in direct communication with the pipe 6 and on the contrary, gases from the pipe 6 must first pass through the lower chamber 30 and up through the pipes 31 whence they are discharged into the chamber 9. Horizontal catalyst layers 24 and 27 mounted on partitions 25 and 28 are arranged in a manner similar to that in Figure 1, the perforated partition 25 being provided with a baffle plate 26. An exit pipe 7 is arranged below the partition 28 as in Figure 1.

Reaction gases enter through the opening 5 at the lower portion of the annular space between the inner and outer converter shells 1 and 2 and pass up through the space into the upper compartment 14 which is defined by the partition 13 and by the top piece 3, thence the gases pass downwardly through the chamber 6 into the chamber 30 upwardly through the pipes 31 into the chamber 9 and thence over the baffles 10, 11 and 12 and through the perforated cylinders 17 and 18 and the interposed catalyst 16. The gases then pass down along the shell 1 and through the catalyst layers 24 and 27 as in Figure 1, finally passing out through the pipe 7. Additional cold reaction or inert gas can be introduced through the pipe 8 provided with the damper 34, this pipe communicating directly with the chamber 14.

In operation the gases entering are warmed by radiation and conduction from the shell 1 and serve to cool the latter, any undue rise being controlled by the direct introduction of cold gases through the pipe 8. The cooling effect and operation of the inner converter shell 1 is substantially identical with that in the converter 1 except that instead of radiating heat from the partition 15 this latter is insulated from the catalyst mass by the insulator 36 which may be of any suitable type capable of resisting the temperatures which are encountered. Suitable temperature measuring means may, of course, be used. A very thorough warming of the incoming gases is effected by the design shown in Figure 2, and this is particularly useful in reactions which are not unduly exothermic and which require a very high initial gas temperature. In some cases it may even be necessary to introduce hot gases through the pipe 8.

The radiation of the outer shell of the converter either of the type shown in Figure 1 or in Figure 2, may be increased by suitable fins or corrugations or by a Venetian blind arrangement which may be considered as variable fins. The mechanical construction of the converter shells may also be varied within wide limits, thus, for example, I have illustrated a converter built of flanged rings in Figure 1, and a converter with unit side walls in Figure 2. There are also other possible constructions and the design used must be chosen with due regard to the conditions under which the converter is to operate, taking into consideration material costs and the stresses involved.

The present converter can be used with any type of catalyst for almost any vapor phase catalytic reaction. The nature of the catalyst will, of course, vary with the particular reactions and may vary in the different layers; thus, for example catalysts of relatively low or relatively high concentration may be used in the annulus and catalysts of different concentrations in the horizontal layers. In strongly exothermic reactions it is frequently desirable to use catalysts of lower activity in the annulus and catalysts of high activity in horizontal layers in order to prevent the evolution of undue amounts of heat in the annulus where the concentration of reaction gases is at a maximum. The present invention is, of course, not concerned with any particular catalyst or with any particular reaction and may be used with a wide number. I have found that the converter is excellently suited for the oxidation of sulfur dioxide to sulfur trioxide and gives high commercial yields and outputs with platinum catalysts or with catalysts which do not contain platinum, such as, for example, highly active vanadium catalysts.

The converters of the present invention are also well suited for the catalytic oxidation of organic compounds and particularly of aromatic compounds such as naphthlene, phthalic anhydride and maleic acid, anthracene to anthraquinone, etc. In these reactions the product desired is an intermediate oxidation product and in many cases is not stable at high temperatures, so that it is desirable, not only to keep the catalyst from overheating but also to rapidly cool down the reaction gases. In such reactions it is usually undesirable to provide uncooled catalyst layers and preferably therefore, no horizontal catalyst layers are associated with the annular catalyst layers. This rapid chilling is effected in the annular catalyst layer by the fact that the gases immediately after passing through the catalyst strike the shell of the converter and are rapidly cooled.

The converters of the present invention may be built in new installations or in many cases old converters may be rebuilt to utilize the advantages of the present invention. Thus, for example, I have found that it is a relatively simple matter to rebuild converters of the Grillo type to produce converters according to the present invention and it is an advantage of the present invention that the principles used therein are applicable to many converters which have already been built with a relatively low cost of redesigning. The invention is, of course, not limited to rebuilt converters or new converters and the choice as to which shall be used will depend in large measure on the economics of the situation. In some cases it is cheaper to rebuild old converters, in others to build new ones and the flexibility of the present invention permits its utilization in new installations or old and adapts itself to many advantageous structural forms.

I claim—

1. A catalytic apparatus comprising a converter, a catalytic chamber therein, an annular catalyst layer in said chamber adjacent to the chamber wall, means for introducing reaction gases into the interior of the catalyst annulus, and means for permitting said gases to pass through the catalyst layer at approximately right angles to the axis thereof.

2. A catalytic apparatus comprising a converter, a catalytic chamber therein, an annular catalyst layer in said chamber adjacent to the chamber wall, means for introducing reaction gases into the interior of the catalyst annulus, means for permitting said gases to pass through the catalyst layer at approximately right angles to the axis thereof, and means in the center of said catalyst chamber for causing the reaction gases to take a sinuous path.

3. Catalytic apparatus comprising in combination a converter having a shell, a partition at the upper portion of said shell, a partition therebelow of smaller cross-section than that of the converter, a perforated annular catalyst chamber connecting the two partitions, an open-ended tube depending from the central portion of the upper partition down to a point slightly above the lower partition, a cylindrical baffle tube surrounding and concentric with said central tube and depending from the upper partition, an open-ended cylindrical baffle tube rising from the lower partition between the central tube and the upper baffle tube and concentric therewith, said tubes being located within and concentric with the annular catalyst chamber, and means for introducing reaction gases into said central tube.

4. A catalytic apparatus comprising a converter, a catalytic chamber therein, an annular catalyst layer in said chamber adjacent to the chamber wall, means for introducing reaction gases into the interior of the catalyst annulus, means for permitting said gases to pass through the catalyst layer at approximately right angles to the axis thereof, at least one horizontal catalyst layer below said annular layer, and means for causing gases after passing through said annular layer to pass through said horizontal layer.

5. An apparatus according to claim 4, in which the catalysts in the annular layer and in the horizontal layer are of unequal strength, the stronger catalyst being located in the horizontal layer.

6. A catalytic apparatus comprising a converter having an outer shell and an inner shell, a catalyst chamber in said inner shell, an annular catalyst layer in said chamber and adjacent to the chamber wall, means for introducing reaction gases into the interior of the catalyst annulus, means for permitting said gases to pass through the catalyst layer at approximately right angles to the axis thereof, and means for causing at least a portion of the reaction gases to pass between the shells of the converter before entering the catalyst chamber.

7. A catalytic apparatus comprising a converter having an outer shell and an inner shell, a catalyst chamber in said inner shell, an annular catalyst layer in said chamber and adjacent to the chamber wall, means for introducing reaction gases into the interior of the catalyst annulus, means for permitting said gases to pass through the catalyst layer at approximately right angles to the axis thereof, means in the center of said catalyst chamber for causing the reaction gases to take a sinuous path, and means for causing at least a portion of the reaction gases to pass between the shells of the converter before entering the catalyst chamber.

8. A catalytic apparatus comprising a converter having an outer shell and an inner shell, a partition at the upper portion of said inner shell, a partition therebelow of smaller cross-section than that of the inner shell, a perforated annular catalyst chamber connecting the two partitions, an open-ended tube depending from the central portion of the upper partition down to a point slightly above the lower partition, a cylindrical baffle tube surrounding and concentric with said central tube and depending from the upper partition, an open-ended cylindrical baffle tube rising from the lower partition between the central tube and the upper baffle tube and concentric therewith, said tubes being located within and concentric with the annular catalyst chamber, means for introducing reaction gases into said central tube, and means for permitting at least a portion of the reaction gases to pass between the shells of the converter before entering the catalyst chamber.

9. Catalytic apparatus comprising a converter having an outer shell and an inner shell, a catalyst chamber in said inner shell, an annular catalyst layer in said chamber and adjacent to the chamber wall, means for introducing reaction gases into the interior of the catalyst annulus, means for permitting said gases to pass through the catalyst layer at approximately right angles to the axis thereof, at least one horizontal catalyst layer below said annular layer, means for causing gases after passing through said layer to pass through said horizontal layer, and means for causing at least a portion of the reaction gases to pass between the shells of the converter before entering the catalyst chamber.

10. An apparatus according to claim 9, in which the catalysts in the annular layer and in the horizontal layer are of unequal strength, the stronger catalyst being located in the horizontal layer.

11. A catalytic apparatus comprising a converter having an outer shell and an inner shell, a catalyst chamber in said inner shell, an annular catalyst layer in said chamber and adjacent to the chamber wall, means for introducing reaction gases into the interior of the catalyst annulus, means for permitting said gases to pass through the catalyst layer at approximately right angles to the axis thereof, means for causing at least a portion of the reaction gases to pass between the shells of the converter before entering the catalyst chamber, and means for introducing a portion of the reaction gases directly into the catalyst chamber without passing through the annular space between the converter shells.

12. A catalytic apparatus comprising in combination a converter having an outer shell and an inner shell concentric therewith, a partition extending across the top of the inner shell, a hollow partition below said upper partition and being of smaller cross-section than that of the inner converter shell, an annular catalyst container joining the two partitions, a tube extending through the upper partition into the lower hollow partition, pipes extending from the outer edges of the hollow lower partition through the inner converter shell upwardly through the annular space between the inner and outer shells and then again inwardly through the inner shell and through the annular catalyst container, means for permitting reaction gases to pass through the annular space between the converter shells and thence through the central tube into the hollow lower partition up through the pipes mounted therein and into the central space surrounded by the catalyst container, and baffle means within said central space to cause the gases to be deflected in such a manner that they pass outwardly through the annular catalyst container approximately at right angles to the axis thereof.

Signed at Pittsburgh, Pennsylvania, this 4th day of November, 1926.

ALPHONS O. JAEGER.